United States Patent [19]

Kumakura et al.

[11] Patent Number: 4,620,678
[45] Date of Patent: Nov. 4, 1986

[54] AUTOMATIC MAGNETIC TAPE LOADING APPARATUS

[75] Inventors: Masumi Kumakura, Yokohama; Takeshi Kawashima, Atsugi; Otoya Sakai, Musashino, all of Japan

[73] Assignee: Victor Company of Japan, Ltd., Japan

[21] Appl. No.: 695,732

[22] Filed: Jan. 25, 1985

Related U.S. Application Data

[63] Continuation of Ser. No. 379,504, May 18, 1962, abandoned.

[30] Foreign Application Priority Data

May 19, 1981 [JP] Japan .................. 56-75288

[51] Int. Cl.⁴ .................. G03B 1/58; G11B 15/32
[52] U.S. Cl. ................... 242/195; 226/91; 226/95
[58] Field of Search ............ 242/197, 198, 200, 195, 242/206, 209; 226/7, 91, 95, 97

[56] References Cited

U.S. PATENT DOCUMENTS

| | | | |
|---|---|---|---|
| 2,893,653 | 7/1959 | Schultheis et al. | 242/209 |
| 3,134,527 | 5/1964 | Willis | 242/195 |
| 3,754,723 | 8/1973 | Meyer | 226/91 X |
| 3,795,371 | 3/1974 | Tolini et al. | 226/91 X |
| 3,999,806 | 12/1976 | Hurd | 406/88 X |
| 4,176,382 | 11/1979 | Froehlich et al. | 242/182 X |
| 4,243,186 | 1/1981 | Peter | 242/195 |

FOREIGN PATENT DOCUMENTS 56-47947 9/1981 Japan .................. 242/72 R

*Primary Examiner*—Billy S. Taylor
*Assistant Examiner*—Joseph J. Hail, III
*Attorney, Agent, or Firm*—Lowe, Price, Leblanc, Becker & Shur

[57] ABSTRACT

An automatic magnetic tape loading apparatus in a magnetic tape recording/playback system includes a reel support rotatably mounted in a first recess in a base for supporting an open feed reel, a takeup hub rotatably mounted in a second recess in the base for winding a magnetic tape fed from the open feed reel, and a channel defined in the base for passage therethrough of the magnetic tape as it is supplied from the open feed reel to the takeup hub. The base has thereon a plurality of air ducts for blowing air through the first recess and the channel into the second recess to carry a leading end portion of the magnetic tape from the open feed reel via the channel to the takeup hub until the leading tape end portion is coiled around the takeup hub.

15 Claims, 12 Drawing Figures

AUTOMATIC MAGNETIC TAPE LOADING APPARATUS

This is a continuation, of application Ser. No. 379,504, filed 5/18/82 now abandoned.

BACKGROUND OF THE INVENTION

The present invention relates to an automatic magnetic tape loading apparatus for automatically delivering a leading tape end portion from an open feed reel to a takeup reel in a magnetic tape recording/playback system.

One known automatic tape loader for use with open feed reels is disclosed in Japanese Laid-Open Patent Publication No. 56-47947 filed by Cipher Data Products, Inc. The prior automatic tape loader has an air blower establishing an air flow through a takeup hub out of a tape channel to develop a vacuum in the latter thereby automatically guide the leading end portion of a magnetic tape as unreeled from the open feed reel. Development of a vacuum in the tape channel requires that the tape channel be hermetically sealed to prevent unwanted air leakage, and various parts be disposed in a simple arrangement. A tape buffer mechanism needs to be simple in construction. These requirements have prevented a magnetic tape from being fed at high speeds during a recording or playback mode of operation of a magnetic tape recording/playback system with which the automatic tape loader is associated.

SUMMARY OF THE INVENTION

It is an object of the present invention to provide an automatic magnetic tape loading apparatus for automatically feeding a leading end portion of a magnetic tape from an open feed reel to a takeup hub in a magnetic tape recording/playback system.

According to the present invention, an automatic magnetic tape loading apparatus in a magnetic tape recording/playback system includes a reel support rotatably mounted in a first recess in a base for supporting an open feed reel with a magnetic tape wound therearound. A takeup hub rotatably mounted in a second recess in the base winds the magnetic tape as supplied from the open feed reel. A channel is defined in the base for passage therethrough of the magnetic tape while the tape is being fed from the open feed reel to the takeup hub. A plurality of air ducts are mounted on the base for blowing air streams through the first recess and the channel into the second recess to carry a leading end portion of the magnetic tape from the open feed reel to the takeup hub via the channel. Since the leading end portion of the magnetic tape is fed along on a flow of air, the magnetic tape can be smoothly carried without hitting surrounding parts and hence can be protected against damage. With air being blown into the channel to feed the magnetic tape, the channel does not need to be completely sealed for airtightness and can transport the tape effectively while allowing air leakage from the channel. The leading end portion of the magnetic tape can be reliably fed through the channel which may be of a complicated configuration at a high speed of 45 inches per second, for example, a speed which is relatively high for a magnetic tape recording/playback system having tape tensioning arms.

BRIEF DESCRIPTION OF THE DRAWINGS

The invention will be described in further detail by way of example with reference to the accompanying drawings, in which.

DESCRIPTION OF THE PREFERRED EMBODIMENT

Figure 1:
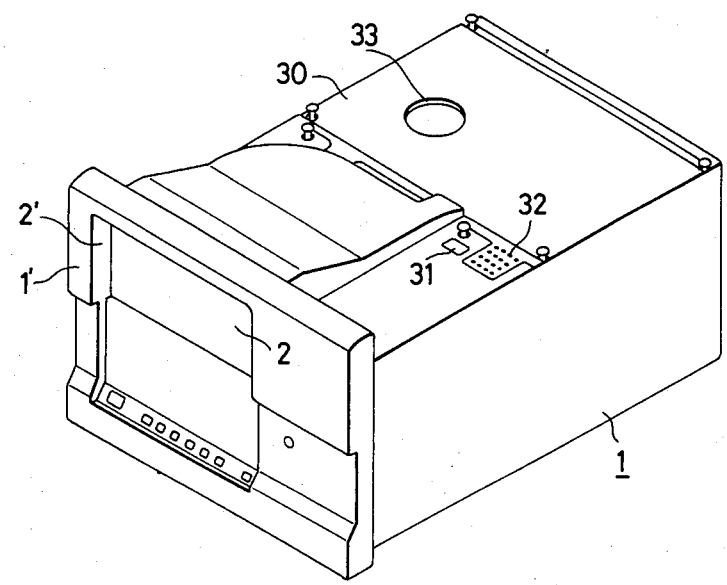
FIG. 1 is a perspective view of a magnetic tape recording/playback system incorporating an automatic magnetic tape loading apparatus according to the present invention.

As shown in FIG. 1, a magnetic tape recording/playback system comprises a casing 1 having a front panel 1' including openable cover 2 which, when opened, allows an open feed reel with a magnetic tape wound therearound to enter into the magnetic tape recording/playback system. The cover 2 can be opened or closed by a suitable latch mechanism (not shown). When a control pushbutton is depressed, the latch mechanism is actuated to lower the cover 2 until a loading and unloading slot 2' is opened in the front panel 1'. Then, an open feed reel with a magnetic tape wound thereon is inserted or withdrawn through the loading and unloading slot 2' into or out of the magnetic tape recorder. The latch mechanism may be constructed such that the cover 2 will automatically be opened when the magnetic tape is completely rewound around the open feed reel after a recording or playback mode of operation has been finished.

Figure 3:
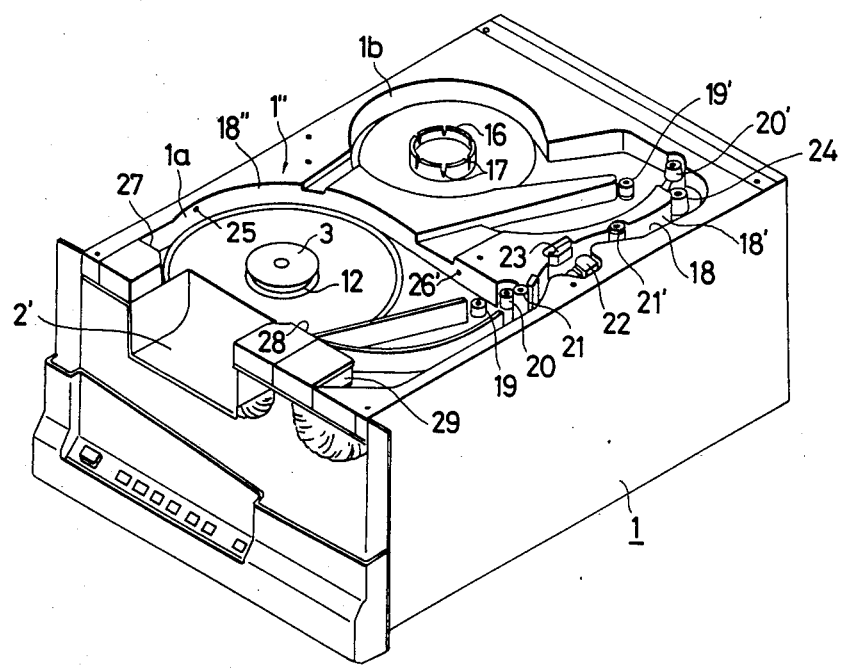
FIG. 3 is a perspective view of the magnetic tape recording/playback system, with an upper cover removed, shown in FIG. 1.

As illustrated in FIG. 3, the magnetic tape recording/playback system has a base 1" having a pair of first and second recesses 1a, 1b spaced from each other, the loading and unloading slot 2' communicating with the first recess 1a. A reel support 3 rotatably mounted in the first recess 1a is substantially cylindrical in shape and has a tapered or rounded upper peripheral edge. The reel support 3 has an integral shaft 7 extending downwardly as shown in FIG. 6 and coupled with an output shaft of a motor 4 mounted on and below the base 1". The reel support 3 is rotatable by the motor 4 either clockwise or counterclockwise about the shaft 7. The reel support 3 can fit in a central hole in a feed reel 6 around which a magnetic tape 5 is wound. The feed reel 6 can be retained securely on the reel support 3 by a reel locking mechanism, which will be described below. In FIGS. 5 through 8, the reel locking mechanism comprises an annular cam plate 8 disposed around the shaft 7 with a ball bearing therebetween for rotation around the shaft 7. The reel support 3 has in an outer annular member 3' thereof a plurality of angularly equi-spaced radial guide holes 9 in each of which there are disposed a cylindrical spacer 10 located radially inwardly and another spacer 11 in the form of a rectangular parallelopiped located radially outwardly of the cylindrical spacer 10. The annular cam plate 8 includes on its outer peripheral surface a plurality of angularly equally spaced cam recesses 8' and a plurality of angularly equally spaced cam projections 8" positioned respectively adjacent the cam recesses. An annular elastic ring 12 such as of rubber extends around the reel support 3 and is received in an annular groove in an outer periphery of the reel support 3 in alignment with the radial guide holes 9. Therefore, the spacers 10, 11 are normally urged by the elastic ring 12 radially inwardly in the radial guide holes 9. When the cam recesses 8' are positioned in radial alignment with the radial guide holes 9, the spacers 10, 11 are biased to move radially inwardly under the resiliency of the elastic ring 12, allowing the feed reel 6 to remain unfixed around the reel support 3. When the cam plate 8 is angularly moved about the shaft 7 to a position in which the cam projections 8" align with the radial guide holes 9, respectively, the spacers 10, 11 are pushed radially outwardly by the cam projections 8" until the spacers 11 are caused to project partly out of the guide hole 9 against the resiliency of the elastic ring 12. At this time, the elastic ring 12 is forced by the spacers 11 to move radially outwardly into pressed engagement with an inner peripheral wall of the feed reel 6. The feed reel 6 is now held in frictional engagement with the elastic ring 12 and hence is retained securely on the reel support 3 against displacement or wobbling movement thereon.

Figure 5:
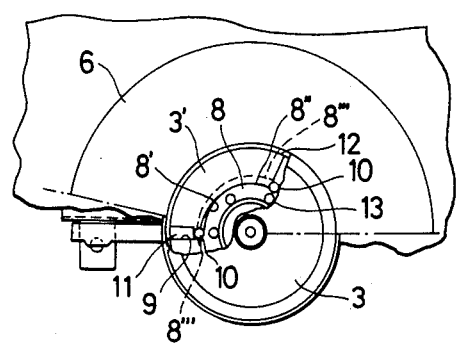
FIG. 5 is a fragmentary plan view of a reel support for an open feed reel in the magnetic tape recording/playback system, with the open feed reel being shown unfixed, shown in FIG. 1.
Figure 6:
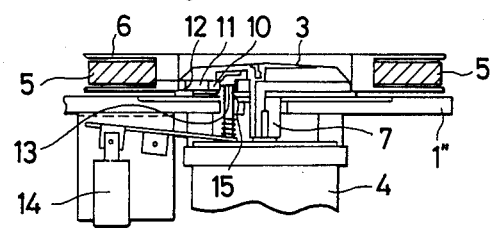
FIG. 6 is a vertical cross-sectional view of the reel support of FIG. 5.

When the feed reel 6 is to be inserted laterally into the magnetic tape recording/playback system through the loading and unloading passage 2', the spacers 10 are positioned in the cam recesses 8', respectively, to allow the elastic ring 12 to be radially inwardly shifted under its own resiliency, as shown in FIGS. 5 and 6. Therefore, the feed reel 6 can easily fit around the reel support 3. The annular cam plate 8 has a plurality of locking projections 8'" extending radially outwardly and located adjacent to cam projections 8", respectively. When the cam plate 8 is angularly moved about the shaft 7 in a direction to move the spacers 10, 11 radially outwardly, the locking projections 8'" are eventually brought into engagement with the spacers 10, respectively, whereupon the cam plate 8 is prevented from angularly moving with respect to the reel support 3.

Figure 8:
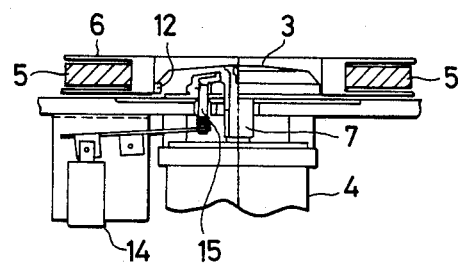
FIG. 8 is a vertical cross-sectional view of the reel support illustrated in FIG. 7.

The annular cam plate 8 has a plurality of angularly equidistant apertures 13. A plunger 14 is mounted on the base 1" as shown in FIGS. 6 and 8, and has a stud 15 movable upwardly or downwardly in response to operation of the plunger 14 into or out of one of the apertures 13. Upon insertion of the stud 15 into one of the apertures 13, the annular cam plate 8 is locked in place for rotation with the reel support 3. The stud 15 may then be retracted out of the aperture 13 once the cam plate 8 is securely retained in the reel support 3.

Figure 2:
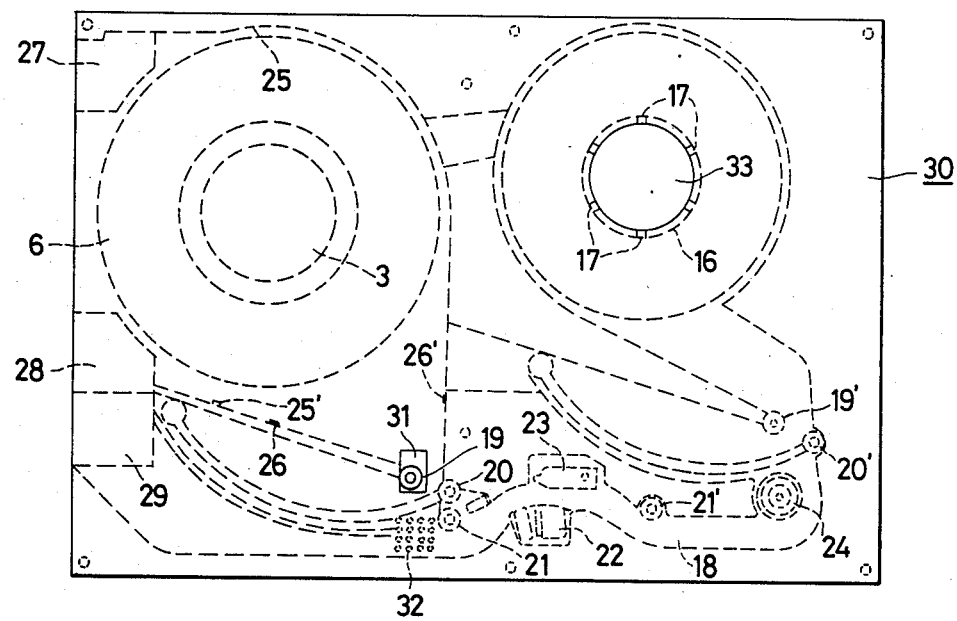
FIG. 2 is a plan view of the magnetic tape recording/playback system shown in FIG. 1.
Figure 4:
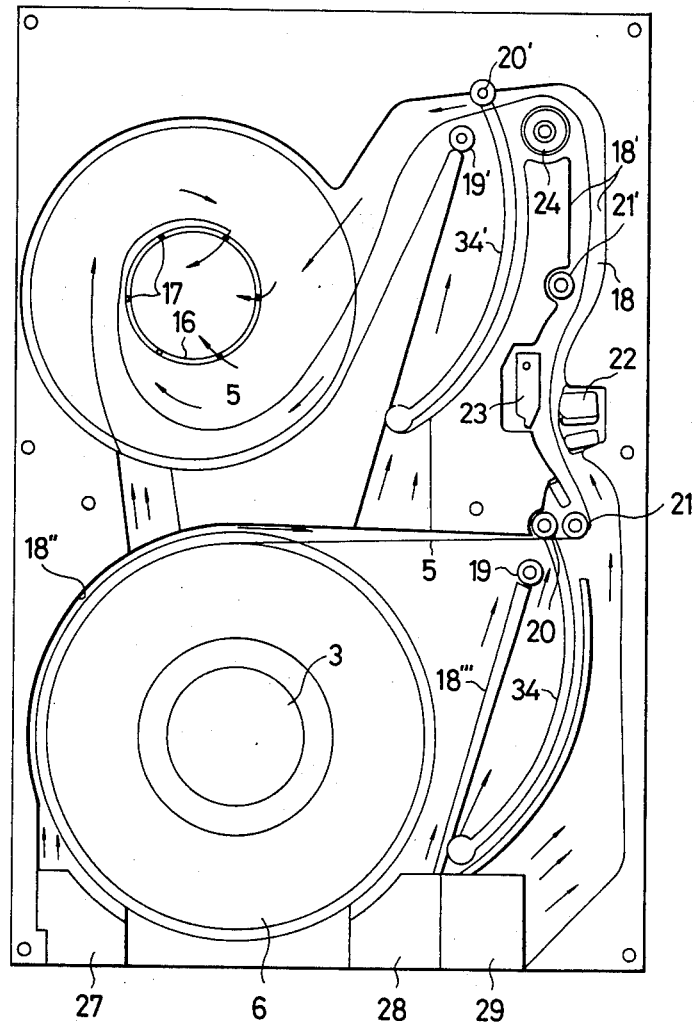
FIG. 4 is an enlarged plan view of an automatic tape loading apparatus in the magnetic tape recording/playback system of FIG. 1.

The magnetic tape recording/playback system also has a takeup hub 16 rotatably mounted in the second recess 1b. The takeup hub 16 has an upper cylindrical end portion for winding therearound the magnetic tape 5, there being a plurality of angularly spaced slits 17 defined in the cylindrical end portion. The takeup hub 16 is coupled with the output shaft of a motor (not shown) disposed below the base 1" for rotation either clockwise or counterclockwise. As best shown in FIGS. 2, 3 and 4, the casing 1 of the magnetic tape recording/playback system has in the base 1a thereof a passage or channel 18 for passage therethrough of the magnetic tape 5 as it is unreeled from the feed reel 6 mounted on the reel support 3 and supplied to the takeup hub 16. The channel 18 extends substantially in the form of a U from the reel support 3 toward the takeup hub 16 and is partly defined by a pair of opposite guide walls 18', 18'. The channel 18 has therein a pair of tape guide rollers 19, 19' located respectively adjacent to the reel support 3 and the takeup hub 16, a pair of idler rollers 20, 20' rotatably supported on a pair of tensioning arms 35, 35' (FIG. 10), respectively, and movable along a pair of arcuate slots 34, 34', respectively, defined in the base 1", and a pair of tape guides 21, 21'. A recording and playback head 22 has a face exposed in the channel 18 and located between the tape guides 21, 21'. A head shield 23 is angularly movably supported on the upper surface of the casing 1 opposing the recording and playback head 22 across the channel 18. A capstan 24 is rotatably mounted in the channel 18 adjacent to the idler roller 20' and is coupled with a rotation sensing mechanism, as described later on.

As best shown in FIGS. 2 and 3, a pair of light-emitting and photodetector elements 25, 26 are disposed in diagonally opposite relation across the reel support 3, and another pair of light-emitting and photodetector elements 25', 26' located adjacent to the reel support 3 one on each side of a path of travel of the magnetic tape 5 as it unwinds from the feed reel 6 mounted on the reel support 3. When the feed reel 6 is properly installed on the reel support 3 or is not placed on the reel support 3, a beam of light emitted from the light-emitting element 25 is allowed to reach the photodetector element 26. Conversely, when the feed reel 6 is improperly mounted on the reel support 3, e.g., the feed reel 6 is placed obliquely on the reel support 3, a beam of light from the light-emitting element 25 is prevented from reaching the photodetector element 26. Thus, the light-emitting and photodetector elements 25, 26 enable the operator to know if the feed reel 6 is properly installed on the reel support 3. A beam of light emitted from the light-emitting element 25' fails to fall upon the photodetector element 26' when the magnetic tape 5 is positioned between the elements 25', 26'. The light-emitting and photodetector elements 25', 26' help the operator in ascertaining whether a leading end portion of the magnetic tape 5 is detached from the feed reel 6.

The capstan 24 is coupled with a motor (not shown) which is operatively connected to the rotation sensing mechanism for sensing slight rotative motion of the motor responsive to angular movement of the capstan 24 about its own axis. The rotation sensing mechanism also serves to produce an alarm signal indicative of a tape loading failure when no rotation of the capstan 24 is sensed upon elapse of a predetermined interval of time after the feed reel 6 has been mounted on the reel support 3 and certain operations have been performed.

A pair of air ducts 27, 28 are mounted on the base 1" of the casing 1 adjacent to and one on each side of the loading and unloading passage 2'. The air ducts 27, 28 have respective openings (not shown) directed along wall surfaces 18", 18"', respectively, extending in surrounding relation to the reel support 3. The air ducts 27, 28 are coupled to a suitable air blower (not illustrated). The wall surfaces 18", 18"' serve to guide air streams flowing from the air blower out of the air ducts 27, 28 so that the air streams will impinge on the both surfaces of the leading end portion of the magnetic tape 5 as it is unwound from the feed reel 6. Another air duct 29 is located adjacent to the air duct 28 and is coupled to the air blower for directing a current of air into the channel 18 to bend the magnetic tape 5 as unreeled from the feed reel 6 around the tape guide 21 into the channel 18 so as to travel between the recording and playback head 22 and the head shield 23.

As illustrated in FIGS. 1 and 2, the magnetic tape recording/playback system includes an upper cover 30 having a hole 31 at a position wherein the air streams flowing from the air ducts 27, 28 meet each other, and a multiplicity of smaller perforations 32 defined near the hole 31 at a position wherein the air streams from the air ducts 27, 28 join the air current from the air duct 29. The upper cover 30 also has a larger opening 33 which opens above the takeup reel 16 in substantially coextensive relation with the upper cylindrical portion thereof.

Figure 9:
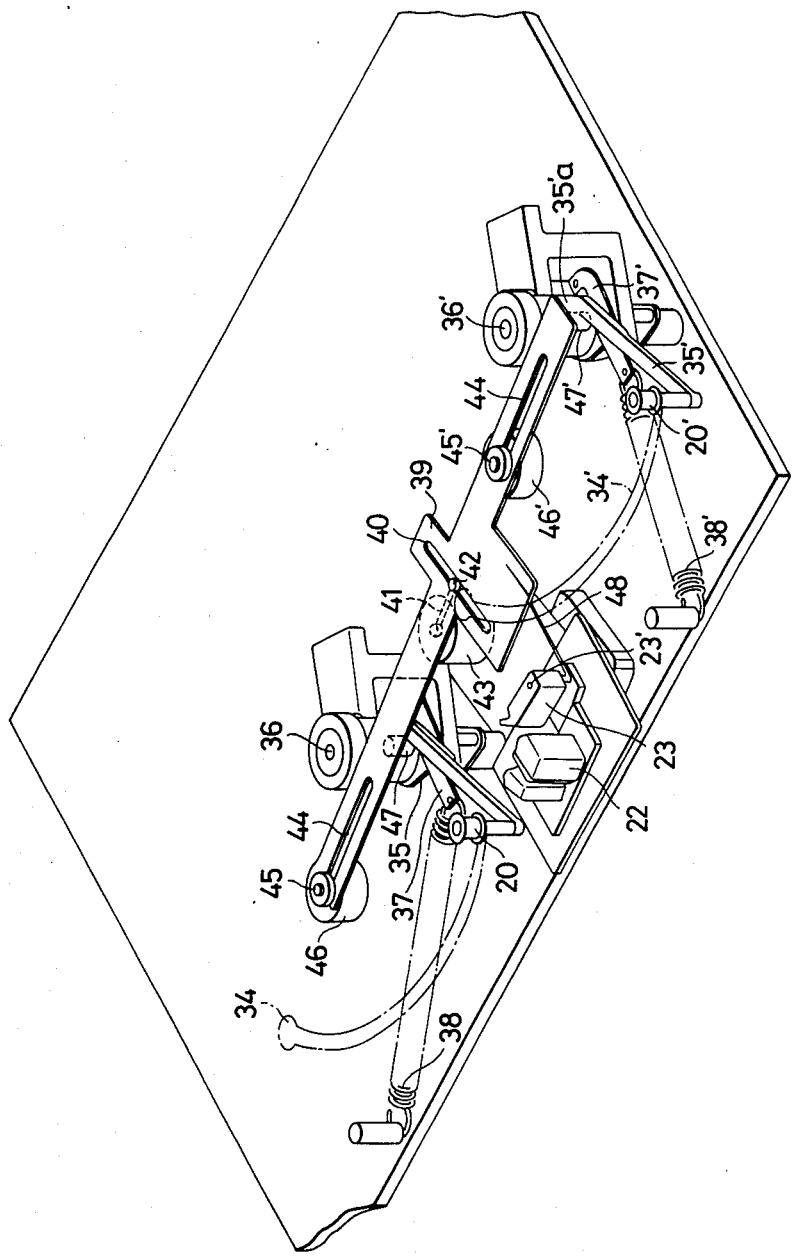
FIG. 9 is an enlarged perspective view of a retractable tensioning mechanism as actuated in the magnetic tape recording/playback system shown in FIG. 1.
Figure 10:
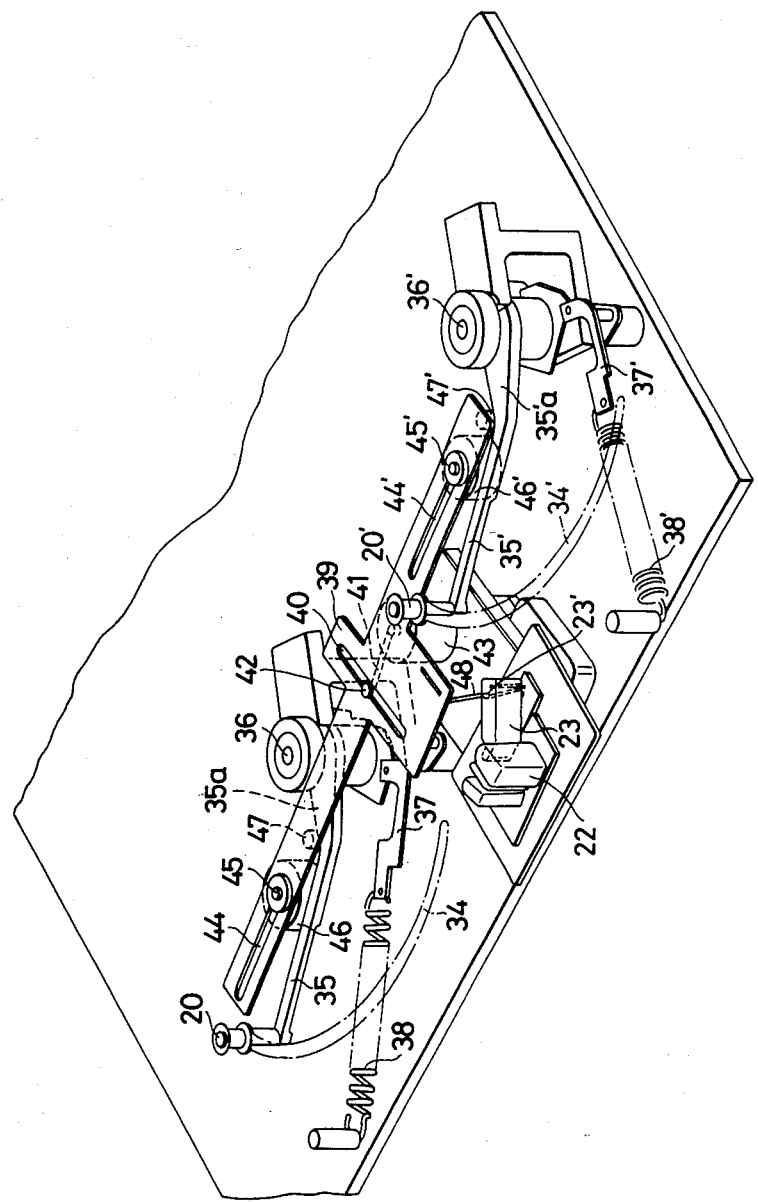
FIG. 10 is a view similar to FIG. 9, showing the retractable tensioning mechanism before being actuated.
Figure 11:
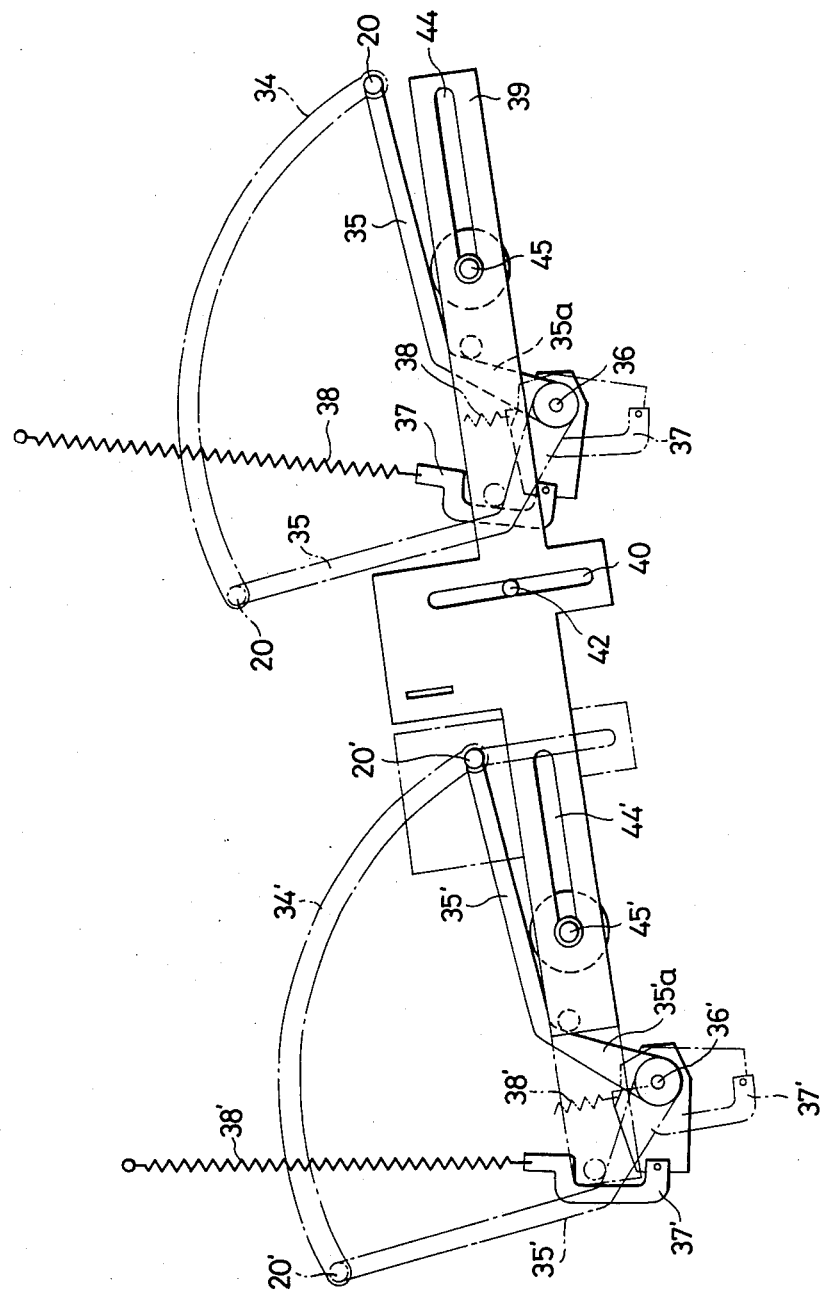
FIG. 11 is a plan view of the retractable tensioning mechanism.
Figure 12:
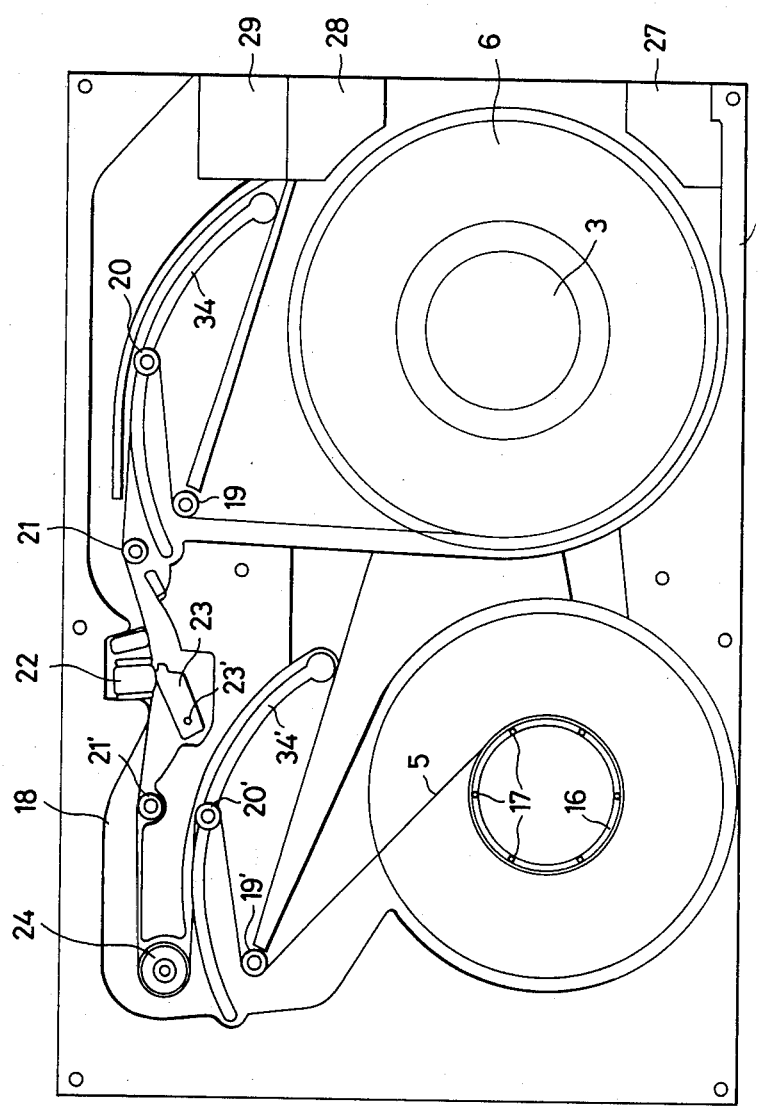
FIG. 12 is a plan view of the magnetic tape recording/playback system shown in FIG. 2 as it operates to feed a magnetic tape.

As illustrated in FIGS. 9 through 11, the tensioning arms 35, 35' are each in the form of a bent bar and mounted on shafts 36, 36', respectively, for angular movement therearound, the idler rollers 20, 20' being supported on distal ends of the tensioning arms 35, 35', respectively, which are remote from the shafts 36, 36'. Angular movement of the tensioning arms 35, 35' respectively about the shafts 36, 36' causes the idler rollers 20, 20' to move along the arcuate slots 34, 34', respectively. A pair of links 37, 37' are pivotably coupled at one ends thereof to the tensioning arms 35, 35', respectively, at the shafts 36, 36'. The other ends of the links 37, 37' are connected to a pair of tension springs 38, 38', respectively, that are attached to the casing 1. The tensioning arms 35, 35' are normally urged by the tension springs 38, 38', respectively, to turn clockwise as shown in FIGS. 11. The tensioning arms 35, 35' coact with an elongated slide plate 39 substantially in the form of a cross having a transverse slot 40 defined in its central portion. The transverse slot 40 receives therein a pin 42 fixed to an end of a swing bar 41 coupled at the other end to the shaft of a reversible motor 43. The slide plate 39 also has a pair of longitudinal grooves 44, 44' one on each side of the central slot 40, in which grooves 44, 44' there are received a pair of guide pins 45, 45', respectively, fastened to the base 1". When the motor 43 is energized to turn the swing bar 41, the pin 42 slides along the slot 40 as the slide plate 39 is caused to be displaced longitudinally in a rectilinear direction which aligns with the direction in which the grooves 44, 44' extend. The guide pins 45, 45' support thereon a pair of rubber dampers 46, 46', respectively, disposed below the slide plate 39 for dampening engagement with the tensioning arms 35, 35', respectively. The slide plate 39 has a pair of pusher pins 47, 47' located adjacent to the grooves 44, 44' and held in abutting engagement with proximal portions 35a, 35'a of the tensioning arms 35, 35', respectively. When the slide plate 39 is longitudinally displaced to the position shown in FIG. 9, the pusher pins 47, 47' push the tensioning arms 35, 35' to turn counterclockwise about the shaft 36, 36' into a retracted position as illustrated in FIG. 9 against the resiliency of the tension springs 38, 38'. The tensioning arms 35, 35' are shaped such that when the idler rollers 20, 20' are located midway in the arcuate slots 34, 34', respectively, the proximal portions 35a, 35'a of the tensioning arms 35, 35' against which the pusher rollers 47, 47' are held extend orthogonally across the direction of longitudinal sliding movement of the slide plate 39. Such a contour of the tensioning arms 35, 35' allows the slide plate 39 to be actuated with substantially constant forces when the tensioning arms 35, 35' are displaced by the slide plate 39 against the biasing force of the tension springs 38, 38'. Although not shown, there is a mechanism for de-energizing the motor 43 when the pin 42 is in the position illustrated in FIG. 9.

As shown in FIGS. 9 and 10, a lever 48 made of springy material has one end loosely coupled to the slide plate 39 near the central slot 40 and the other end connected to the head shield 23. The lever 48 causes the head shield 23 to be pivotably moved away from the recording and playback head 22 when the slide plate 39 is moved to the position shown in FIG. 9. Conversely, when the slide plate 39 is displaced as illustrated in FIG. 10, the head shield 23 is moved toward the head 22 by the lever 48.

The automatic magnetic tape loading apparatus according to the present invention will operate as follows:

The cover 2 is lowered to open the loading and unloading slot 2', and a feed reel 6 with a magnetic tape 5 wound therearound is inserted through the loading and unloading slot 2' laterally onto the reel support 3. As the reel support 3 is driven by its motor to rotate in a tape rewinding direction, the feed reel 6 rotates with the reel support 3 since the feed reel 6 rests thereon due to gravity. At this time, the air blower (not shown) is actuated to supply air streams substantially in equal amounts through the air ducts 27, 28 into the recess 1a in which the feed reel 6 is accommodated. The air streams thus flowing out of the ducts 27, 28 tend to impinge against both surfaces of a leading end portion of the magnetic tape 5. At this time, the tape end portion is liable to be positioned between the light-emitting element 25' and the photodetector element 26', whereupon a beam of light emitted from the light-emitting element 25' is prevented from reaching the photodetector element 26'. With such a condition being indicated in a known manner, the operator can confirm that the feed reel 6 is inserted in the magnetic tape recorder and the leading end portion of the magnetic tape 5 is detached from the rest of the tape 5 wound on the feed reel 6. When the feed reel 6 is properly installed on the reel support 3, a beam of light emanating from the light-emitting element 25 is allowed to reach the photodetector element 26. By indicating energization of the photodetector element 26, the operator is able to know that the feed reel 5 is correctly mounted on the reel support 3.

Figure 7:
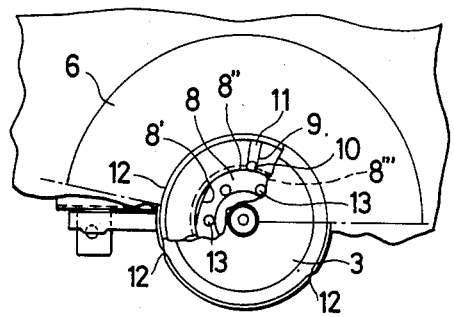
FIG. 7 is a view similar to FIG. 5, showing the open feed reel as fixed to the reel support.

At this time, the spacers 10 are received respectively in the cam recesses 8' under the resiliency of the elastic ring 12 disposed around the reel support 3 as shown in FIGS. 5 and 6, and hence the feed reel 6 is not securely affixed to the reel support 3. The plunger 14 is then actuated to insert the stud 15 into one of the apertures 13 in the annular cam plate 8 as it rotates with the reel support 3, whereupon the cam plate 8 is prevented from rotating. Only the reel support 3 continues to rotate until the spacers 10 are shifted from the cam recesses 8' toward the cam projections 8". The spacers 10 and hence the spacers 11 are caused to be displaced radially outwardly by the cam projections 8", thereby spreading the elastic ring 12 radially outwardly against the inner peripheral wall of the central opening in the feed reel 6. Such shifting movement of the spacers 10 can smoothly be effected since they are cylindrical in shape and held in rolling engagement with the cam projections 8". The feed reel 6 is now fastened frictionally to the reel support 3 for co-rotation, as illustrated in FIGS. 7 and 8. As the feed reel 6 is thus secured to the reel support 3, the locking projections 8''' are brought into abutment against the spacers 10. With the cam plate 8 locked in position against rotation by the stud 15, the reel support 3 is also prevented from rotating about its own axis. After the feed reel 6 has been locked on the reel support 3, the plunger 14 is actuated again to retract the stud 15 downwardly out of the aperture 13 in the cam plate 8. Then, the reel support 3, the cam plate 8 pressed against the spacers 10 under the biasing force of the elastic ring 12, and the feed reel 6 held frictionally against the elastic ring 12 can be driven by the motor 4 for co-rotation.

Then, the idler rollers 20, 20' are brought into their retracted positions as shown in FIG. 4, and the motor 4 is energized to rotate the reel support 3 in a direction to unreel the magnetic tape 5 therefrom. The leading end portion of the magnetic tape 5 is guided by the air streams flowing from the air ducts 27, 28 to travel along into the channel 18 past the guide roller 19. Since the air streams discharged out of the air ducts 27, 28 hit magnetic tape 5 on its both surfaces, the magnetic tape 5 is prevented from getting attached to the guide walls of the channels 18 and hence travels smoothly along the channel 18 while the magnetic tape 5 is floating. The air streams as they meet are allowed partly to escape through the hole 31 in the upper cover 30 out of the magnetic tape recorder, so that the magnetic tape 5 is less subjected to air disturbances when it passes through a region in which the air streams are joined together. Therefore, the magnetic tape 5 can smoothly be fed along into the channel 18. When the leading end portion of the magnetic tape 5 reaches the tape guide 21, an air current discharged out of the air duct 29 impinges upon the tape end portion and bends the latter around the tape guide 21 toward the recording and playback head 22. The air current is supplied from the air duct 29 in such a quantity that the air streams coming from the air ducts 27, 28 are prevented from going toward the air duct 29, but instead are forced to flow toward the takeup hub 16 along the channel 18. The multiplicity of perforations 32 in the upper cover 30 permit a portion of the air current from the air duct 29 and the air streams from the air ducts 27, 28 as they are mixed together to be discharged therethrough out of the channel 18. Thus, no air disturbance is created in the vicinity of the tape guide 21, and hence the magnetic tape 5 is smoothly fed along through an area in which the air flows from the air ducts 27, 28, and 29 meet each other. The multiplicity of perforations 32 for smooth delivery of the magnetic tape 5 are better than the single hole 31 because the perforations 32 serve to diffuse and weaken the air flow as it is discharged therethrough. The air streams from the air ducts 27–29 then flow along the channel 18 past the recording and playback head 22 and the capstan 24 toward the takeup hub 16. The magnetic tape 5 is carried by such air streams to travel from the feed reel 6 toward the takeup hub 16. The air flow which has arrived at the takeup hub 16 is allowed to flow into the latter through the slits 17, and then to flow out through the opening 33 in the upper cover 30. As the takeup hub 16 rotates, the air tends to swirl into the slits 17 and out of the opening 33. Such a swirling motion of air causes the leading tape end portion of the magnetic tape 5 that has reached the takeup hub 16 to get stuck to the latter and coiled therearound.

The takeup hub 16 is arranged to rotate faster than the feed reel 6. Before the leading end portion of the magnetic tape 5 is attached to and coiled around the takeup hub 16, the magnetic tape 5 is subjected to no tension, and does not impose any rotative force on the capstan 24. When the leading tape end portion starts being wound around the takeup hub 16 and coiled therearound at the speed at which the takeup hub 16 rotates, the magnetic tape 5 undergoes a sudden tensioning force, whereupon the capstan 24 is slightly rotated about its own axis. Such slight rotation of the capstan 24 is sensed by the rotation sensing mechanism (not shown) to let the operator know that the leading end portion of the magnetic tape 5 has reached and is wound around the takeup hub 16. Thus, the operator is not required to open the upper cover 30 and visually inspect the takeup hub 16 to see if the leading tape end portion has properly been wound around the takeup hub 16. As described above, an alarm indicative of a tape loading failure is generated when any rotation of the capstan 24 is not detected upon elapse of a certain period of time after the magnetic tape 5 has started being supplied from the feed reel 6. Upon issuance of such an alarm, the operator is required to rewind the magnetic tape 5 and repeat the foregoing operation.

When the leading end portion of the magnetic tape 5 is properly coiled and the magnetic tape 5 starts traveling through the channel 18, the motor 43 (FIGS. 9 and 10) is energized to turn the swing bar 41 in a direction to move the slide plate 39 toward the position shown in FIG. 10, whereupon the tensioning arms 35, 35' are caused under the bias of the tension springs 38, 38' to turn clockwise as shown in FIG. 11. The idler rollers 20, 20' are now displaced along the arcuate slots 34, 34' away from their retracted positions as illustrated in FIGS. 4 and 9. The magnetic tape 5 is entrained by the idler rollers 20, 20' and is caused thereby to travel in sharply bent paths, so that the magnetic tape 5 is subjected to increased tension. Simultaneously with the displacement of the idler rollers 20, 20', the slide plate 39 causes the lever 48 to swing the head shield 23 around toward the recording and playback head 22, as shown in FIG. 10 to bring the magnetic tape 5 into pressed engagement with the head 22 for a recording or playback mode of operation of the magnetic tape recorder.

The magnetic tape 5 is then continuously supplied from the feed reel 6 and wound around the takeup hub 16 as the tape 5 is constantly tensioned by the idler rollers 20, 20' positioned substantially midway along the arcuate slots 34, 34'. While the magnetic tape 5 is thus travelling along, recorded information is picked up from the tape 5 or information is recorded on the tape 5 by the recording and playback head 22.

The magnetic tape 5 while being thus fed along, it is subjected to a constant tension T which can be expressed as follows:

$$T = \frac{\{r(1 - \cos\theta) + \delta'\} k \cdot r \cdot \sin\theta}{L}$$

where $\theta$ is the angle of angular movement of each of the idler rollers 20, 20', the angle $\theta$ ranging from 90 to 180 degrees and being 90 degrees when each idler roller is positioned at the end of the arcuate slot remotely from the retracted position, L is the length of each of the tensioning arms 35, 35', $\delta'$ is the length of each of the tension springs 38, 38' when the idler rollers 20, 20' are located at the end of the arcuate slots 34, 34' remotely from the retracted positions, r is the length of a line extending between the axis of each of the shafts 36, 36' and an extension of one of the tension springs 38, 38', the line extending normally to the extension, when the idlers 20, 20' are disposed at the ends of the arcuate slots 34, 34' remotely from the retracted positions, and k is the spring constant of each of the tension springs 38, 38'. When the tensioning arms 35, 35' are brought to the positions as illustrated in FIG. 11 under the resiliency of the tension springs 38, 38', the biasing force of each of the tension springs 38, 38' is applied along a direction which extends perpendicularly to a radial direction of one of the shafts 36, 36'. The tension springs 38, 38' become most elongated when the idler rollers 20, 20' are fully retracted by the pusher pins 47, 47' engaging the tensioning arms 35, 35'. Such an arrangement allows the magnetic tape 5 to be kept under substantially constant tension even when the tensioning arms 35, 35' are slightly displaced in position.

After necessary information has been picked up from or recorded on the magentic tape 5 by the head 22, the motor 43 is actuated to rotate its shaft in the opposite direction for thereby moving the slide plate 39 until the pusher pins 47, 47' displaces the tensioning arms 35, 35' toward the retracted positions against the resilient forces of the tension springs 38, 38'. Then, the motor 4 is energized to rotate the feed reel 6 in a direction to rewind the magnetic tape 5 from the takeup hub 16. After the magnetic tape 5 has completely rewound around the feed reel 6, the feed reel 6 is unlocked from the reel support 3 and is taken out through the loading and unloading slot 2' with the cover 2 lowered.

With the automatic magnetic tape loading apparatus thus constructed, the operator is not required to visually inspect the magnetic tape 5 to see if its leading end portion is properly coiled around the takeup hub 16. Therefore, the magnetic tape recording/playback system can be placed in a cabinet or the like with only the front panel 1 exposed for the operator to be able to have access to various control pushbuttons, and hence is less subjected to limitations as to places of installation.

Although a certain preferred embodiment has been shown and described in detail, it should be understood that various changes and modifications may be made therein without departing from the scope of the appended claims.

What is claimed is:

1. An automatic magnetic tape loading apparatus in a magnetic tape recording/playback system, comprising:
   a base having a pair of first and second recesses spaced from each other, and a channel connected to and extending between said first and second recesses;
   a cover covering said first and second recesses and said channel;
   a reel support rotatably mounted in said first recess for supporting an open feed reel having a magnetic tape wound thereon;
   a takeup hub rotatably mounted in said second recess for winding the magnetic tape from said open feed reel received through said channel;
   first means on said base for supplying two streams of air under positive pressure into said first recess in directions around said open feed reel and toward said channel to direct a leading end portion of said magnetic tape from said open reel toward said channel; and
   second means on said base adjacent said first means and outside of said channel for supplying a current of air under positive pressure into said channel toward said second recess to carry said leading end portion of the magnetic tape in coaction with said streams of air from said first means down said channel toward said second recess, said second means being located upstream from an entrance opening of said channel through which opening said tape enters the channel from the first recess, said cover having an opening positioned for discharging from said second recess said streams and current of air introduced under positive pressure into said second recess after said streams and current of air carry said leading end portion of the magnetic tape down said channel into said second recess and cause said leading end portion to become coiled around and attached to said takeup reel.

2. An automatic magnetic tape loading apparatus according to claim 1, wherein said first means includes a pair of first and second air ducts for blowing air streams into said first recess circumferentially around said open feed reel so as to impinge on both surfaces of said leading end portion of said magnetic tape after it has peeled off said open feed reel.

3. An automatic magnetic tape loading apparatus according to claim 2, wherein said magnetic tape recording/playback system includes a tape loading and unloading slot communicating with said first recess, said first and second air ducts being positioned one on each side of said tape loading and unloading slot.

4. An automatic magnetic tape loading apparatus according to claim 2, wherein said base includes guide walls disposed in opposite relation across said reel support for guiding said air streams to join each other at an end of said first recess communicating with said channel.

5. An automatic magnetic tape loading apparatus according to claim 2, wherein said second means includes a third air duct positioned adjacent to said second air duct for blowing an air current into said channel to carry said leading end portion of said magnetic tape in and along said channel away from said open feed reel toward said second recess.

6. An automatic magnetic tape loading apparatus according to claim 4, wherein said cover has a hole located at said end of said first recess for allowing a portion of said air streams joining together to be discharged out of said magnetic tape recording/playback system.

7. An automatic magnetic tape loading apparatus according to claim 6, wherein said cover has a multiplicity of perforations defined therein adjacent said hole for discharging a portion of said air current and said air streams out of said channel.

8. An automatic magnetic tape loading apparatus according to claim 1, wherein said takeup hub has a plurality of angularly spaced slits for allowing air introduced under positive pressure in said second recess to pass therethrough into said takeup hub, thereby causing said leading end portion of said magnetic tape to become coiled around said takeup hub.

9. An automatic magnetic tape loading apparatus according to claim 8, wherein said opening is disposed over and substantially coextensive with said takeup hub for allowing said streams and current of air introduced under positive pressure to be discharged from said takeup hub out of said magnetic tape recording/playback system.

10. The automatic magnetic tape loading apparatus of claim 1, wherein said cover is attached to cover the first and second recesses and the channel to establish with said first and second air supply means a non air tight air flow tape guiding arrangement.

11. The apparatus of claim 1, wherein said first and second means supplying air under positive pressure into and towards said channel operate to coil the leading end portion of said tape around the takeup reel without positioning other sources of air current within said channel.

12. The automatic magnetic tape loading apparatus of claim 1, wherein said base includes a tape loading and unloading slot communicating with the recess, and wherein said first means supplies two streams of air under positive pressure substantially in equal amounts into said first recess in circumferentially opposite directions around said open feed reel and toward said channel to direct a leading end portion of said magnetic tape from said open reeel toward said channel, and wherein said second means includes a single air duct disposed adjacent said first means and outside of said channel for supplying a current of air under positive pressure into said channel toward said second recess to carry said leading end portion of the magnetic tape in coaction with said first means down said channel toward said second recess.

13. An automatic magnetic tape loading apparatus in a magnetic tape recording/playback system, including:
a base having a pair of first and second spaced recesses, and a tape guide channel communicating between said first and second recesses, said first recess having an end opening into said tape guide channel;
a reel support rotatably mounted in said first recess for supporting thereon an open feed reel having a magnetic tape wound thereon;
a takeup hub rotatably mounted in said second recess for winding the magnetic tape from said open feed reel through said tape guide channel;
a pair of first and second spaced air ducts disposed adjacent to said first recess for introducing respective air streams under positive pressure into said first recess circumferentially around said open feed reel to impinge on both surfaces of said magnetic tape to direct a leading end portion of said magnetic tape toward and through said end of said first recess into said tape guide channel; and
a third air duct disposed adjacent to said second air duct outside of said tape guide channel for introducing an air current under positive pressure into said tape guide channel to guide said leading end portion of said magnetic tape as it emerges from said end of said first recess down said tape guide channel toward said second recess, wherein said magnetic tape recording/playback system includes a cover for covering said first and second recesses and said tape guide channel, said cover having a hole positioned over said end of said first recess for discharging a portion of said air streams from said first and second air ducts, a multiplicity of perforations adjacent to said hole for discharging a portion of said air streams and current from said tape guide channel, and an opening positioned over and substantially coextensive with said takeup hub for allowing said air streams and current to be discharged from said takeup hub out of said magnetic tape recording/playback system.

14. An automatic magnetic tape loading apparatus in a magnetic tape recording/plackback system, comprising:
a base having a pair of first and second recesses spaced from each other, and a channel connected to and extending between said first and second recesses, said base having a tape loading and unloading slot communicating with said first recess;
a cover covering said first and second recesses and said channel and having an opening vented to atmosphere;
a reel support rotatably mounted in said first recess for winding the magnetic tape from said open feed reel received through said channel, said takeup hub including a cylindrical portion having a plurality of slits and disposed below said opening in said cover;
a pair of first and second spaced air ducts disposed one on each side of said tape loading and unloading slot for blowing air streams under positive pressure into said first recess circumferentially around said open feed reel so as to impinge on both surfaces of said leading end portion of said magnetic tape after it has peeled off said open feed reel to direct said leading end portion into said channel;
a third air duct disposed adjacent to said second air duct outside of said channel for introducing an air current under positive pressure into said channel to carry said leading end portion of said magnetic tape as it emerges from said first recess down said channel toward said second recess;
a pair of tape tensioning devices mounted on said base in the vicinity of respective ends of said channel, each of said tape tensioning devices having a tensioning arm pivotally mounted on said base, an idler roller rotatably mounted on a distal end of said tensioning arm for engaging said magnetic tape extending through said channel, said idler roller being angularly movable in and along an arcuate path defined in said base in response to angular movement of said tensioning arm for normally urging said idler roller in a direction to tension said magnetic tape in engagement therewith; and
third means for angularly moving each said tensioning arm against the force of said tension spring to release the tension of said magnetic tape.

15. An automatic magnetic tape loading apparatus in a magnetic tape recording/playback system, comprising:
a base having a pair of first and second recesses spaced from each other, and a channel connected to and extending between said first and seccnd recesses, said base having a tape loading and unloading slot communicating with said first recess;

a cover covering said first and second recesses and said channel and having an opening vented to atmosphere;

a reel support rotatably mounted in said first recess for supporting an open feed reel having a magnetic tape wound thereon;

a takeup hub rotatably mounted in said second recess for winding the magnetic tape from said open feed reel received through said channel, said takeup hub including a cylindrical portion having a plurality of slits and disposed below said opening in said cover;

a pair of first and second spaced air ducts disposed one on each side of said tape loading and unloading slot for blowing air streams under positive pressure into said first recess circumferentially around said open feed reel so as to impinge on both surfaces of said leading end portion of said magnetic tape after it has peeled off said open feed reel to direct said leading end portion into said channel;

a third air duct disposed adjacent to said second air duct outside of said channel for introducing an air current under positive pressure into said channel to carry said leading end portion of said magnetic tape as it emerges from said first recess down said channel toward said second recess;

a pair of tape tensioning devices mounted on said base in the vicinity of respective ends of said channel, each of said tape tensioning devices having tensioning arm pivotally mounted on said base, an idler roller rotatably mounted on a distal end of said tensioning arm for engaging said magnetic tape extending through said channel, said idler roller being angularly movable in and along an arcuate path defined in said base in response to angular movement of said tensioning arm, and a tension spring acting on said tensioning arm for normally urging said idler roller in a direction to tension said magnetic tape in engagement therewith; and means for angularly moving each said tensioning arm against the force of said tension spring to release the tension of said magnetic tape.

* * * * *